US009195158B2

(12) United States Patent
Veregin et al.

(10) Patent No.: US 9,195,158 B2
(45) Date of Patent: *Nov. 24, 2015

(54) CARRIER RESINS WITH IMPROVED RH SENSITIVITY

(71) Applicants: Xerox Corporation, Norwalk, CT (US); National Research Council of Canada, Ottawa (CA)

(72) Inventors: Richard P N Veregin, Mississauga (CA); Qingbin Li, Edmonton (CA); Andriy Kovalenko, Edmonton, CA (US); Sergey Gusarov, Edmonton (CA); Daryl W Vanbesien, Burlington (CA); Michael S Hawkins, Cambridge (CA)

(73) Assignees: Xerox Corporation, Norwalk, CT (US); NRC of Canada, Ottawa (CA)

( * ) Notice: Subject to any disclaimer, the term of this patent is extended or adjusted under 35 U.S.C. 154(b) by 97 days.

This patent is subject to a terminal disclaimer.

(21) Appl. No.: 13/917,667

(22) Filed: Jun. 14, 2013

(65) Prior Publication Data

US 2014/0370435 A1    Dec. 18, 2014

(51) Int. Cl.
*G03G 9/113* (2006.01)
*G03G 9/107* (2006.01)
*G03G 9/087* (2006.01)
*C08F 220/18* (2006.01)
*C08F 220/26* (2006.01)
*C08F 220/34* (2006.01)
*C08F 220/38* (2006.01)

(52) U.S. Cl.
CPC ............ *G03G 9/1075* (2013.01); *C08F 220/18* (2013.01); *G03G 9/08755* (2013.01); *C08F 220/26* (2013.01); *C08F 220/34* (2013.01); *C08F 220/38* (2013.01)

(58) Field of Classification Search
CPC .......... G03G 9/09708; G03G 9/09716; G03G 9/09725; G03G 9/1133; G03G 9/1139; G03G 9/1136
USPC ................ 430/111.35, 108.6, 108.7; 524/562
See application file for complete search history.

(56) References Cited

U.S. PATENT DOCUMENTS

| | | | | |
|---|---|---|---|---|
| 5,182,181 A * | 1/1993 | Koizumi et al. | ........... | 430/111.1 |
| 5,254,422 A * | 10/1993 | Kato et al. | ................... | 430/49.6 |
| 5,272,038 A * | 12/1993 | Matsubara et al. | ...... | 430/111.35 |
| 5,340,677 A * | 8/1994 | Baba et al. | ............... | 430/111.35 |
| 6,168,908 B1 * | 1/2001 | Suzuki et al. | ................. | 430/325 |
| 8,222,313 B2 * | 7/2012 | Iftime et al. | .................... | 522/75 |
| 8,361,631 B2 * | 1/2013 | Wu | ........................... | 428/500 |
| 8,663,886 B2 * | 3/2014 | Vanbesien et al. | ......... | 430/108.4 |
| 2001/0049075 A1 * | 12/2001 | Kishimura et al. | ........... | 430/322 |
| 2004/0170918 A1 * | 9/2004 | Maesawa et al. | .......... | 430/270.1 |
| 2010/0010129 A1 * | 1/2010 | Shigematsu et al. | .......... | 524/158 |
| 2011/0097662 A1 * | 4/2011 | Vanbesien et al. | ....... | 430/111.31 |
| 2011/0281209 A1 * | 11/2011 | Sugiura et al. | ................ | 430/105 |
| 2012/0156605 A1 * | 6/2012 | Vanbesien et al. | ......... | 430/108.2 |
| 2012/0156606 A1 * | 6/2012 | Vanbesien et al. | ......... | 430/108.2 |
| 2012/0288790 A1 * | 11/2012 | Sweeney et al. | .......... | 430/108.2 |
| 2014/0128541 A1 * | 5/2014 | Farrugia et al. | ............... | 524/745 |
| 2014/0370429 A1 * | 12/2014 | Veregin et al. | ............. | 430/108.3 |

* cited by examiner

*Primary Examiner* — Hoa V Le
(74) *Attorney, Agent, or Firm* — MDIP LLC

(57) ABSTRACT

The instant disclosure describes methacrylate coated carrier resins with aromatic substituent groups with optionally carbon atoms replaced by heteroatoms such as S, N, and O for charge control and improved RH sensitivity.

16 Claims, No Drawings

CARRIER RESINS WITH IMPROVED RH SENSITIVITY

FIELD

The instant disclosure relates generally to carrier resins, and specifically carrier coating resins having at least one monomer with an ester group, where that ester group comprises an electron delocalizing aromatic group, where such resins exhibit improved RH sensitivity, and high and tunable charge.

BACKGROUND

The properties of a toner are set through the selection of materials and amounts of those materials of the toner. The charging characteristics of a toner are also dependent on the carrier used in a developer composition, such as, the carrier coating. Toners typically comprise as least a binder resin, a colorant and one or more external surface additives. The external surface additives are generally added in small amounts. Examples of external surface additives include, for example, silica, titanium dioxide, zinc stearate, and the like. The carrier resin interacts with the surface additives.

Toners having a triboelectric charging property within the range of about $-30$ µC/g and about $-45$ µC/g may be achieved when using smaller-sized silica particles as external additives, for example, silica particles having average sizes less than 20 nm, such as, for example, R805 (~12 nm) and/or R972 (~16 nm) (Evonik, N.J.). However, developability at areas of low toner area coverage degrades over time. That has been attributed to the smaller-sized additives being impacted into the toner surface over time.

The problem with smaller-sized additives was considered and as an alternative, larger-sized additives, i.e., additives having a size of 40 nm or larger, such as, for example, RX50 silica, RX515H silica or SMT5103 titania (Evonik, N.J.) were used. However, although the above problem was addressed, the toners do not exhibit as high a triboelectric charging ability and also exhibit charge through. When such developers are tested at low area coverage followed by high area coverage, the developers tend to exhibit low or wrong sign toner due to charge through, i.e., the incumbent toner in the device becomes less negative or even wrong sign, i.e., positive, and the new (fresh) toner added may charge very negative. The presence of low charge and/or wrong sign toner can result in objectionable background.

Hence, there remains an issue in providing high charge and good RH sensitivity under changing environmental conditions for carrier coating resin design. For example, there remains a need to tune the charge of the carrier resin to produce higher charge for those situations where higher charge is required. To obtain both high charge and good RH sensitivity in a single design is an unfulfilled need.

Further, toners often contain silica as a surface additive. Silica is a charge driver for a toner and is RH sensitive. Thus, new carrier designs that work well with silica to improve RH sensitivity, while maintaining high charge are needed.

SUMMARY

The instant disclosure describes a carrier resin comprising at least one monomer comprising a vinyl group, where a carbon of the vinyl group can be substituted with a methyl group, and that carbon also can be substituted with an ester group, wherein the ester group comprises an electron delocalizing aromatic group. In embodiments, the aromatic group may be a heterocycle, wherein one or more carbon atoms is replaced with, for example, S, N or O. In embodiments, the aromatic group comprises one or more substituents, such as, an amine, a hydroxyl, a thiol, a halogen, an alkoxy, from $C_1$-$C_{10}$, and so on. In embodiments, the vinyl group comprises an acrylate monomer. In embodiments, the acrylate is a methacrylate monomer. The resins demonstrate improved RH sensitivity and are tunable to maximize charge. The disclosure relates to a carrier comprising a resin of interest and developers comprising said coated carrier.

In embodiments, a carrier coating resin is disclosed comprising one or more monomer units, where at least one monomer unit comprises the formula, or isomers thereof:

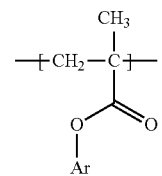

wherein Ar comprises an electron delocalizing group comprising at least one aromatic group, which may be a heterocycle, which may be substituted or both.

In embodiments, a process of preparing a latex coating resin is disclosed where the dried resin comprises a particle size of about 50 nm to 500 nm; recovering the polymerized resin as a solution or drying the polymerized resin solution to form a powder; and coating the resin on a core, such as, a magnetic core.

DETAILED DESCRIPTION

The disclosure relates to methacrylate carrier resins, where the resin has the Highest occupied molecular orbital (HOMO) electron density substantially located on a hydrophobic group, and where the HOMO electron density located on the carbonyl group of a monomer comprising an ester function is effectively reduced, thereby obtaining both high charge and improvement in RH sensitivity.

In embodiments, a carrier coating resin is disclosed comprising one or more monomer units, where at least one of the monomer units comprises a vinyl group, where one carbon of the vinyl group can be substituted with a methyl group and where that same carbon atom of the vinyl group can be substituted with an ester group, wherein the ester comprises an electron delocalizing group comprising at least one aromatic ring, where the aromatic ring can comprise multiple rings, fused rings, and the like, wherein an aromatic ring can be a heterocycle and wherein the aromatic group can be substituted, where the monomer has a carbon:oxygen (C/O) ratio of at least 3, at least 4, at least 5 or more. Examples of such aromatic electron delocalizing groups include a phenyl group, a benzyl group, a thiopyran group, a pyridinyl group, a naphthyl group, a pyranyl group and so on.

As used herein, the modifier "about" used in connection with a quantity is inclusive of the stated value and has the meaning dictated by the context (for example, it includes at least the degree of error associated with the measurement of the particular quantity). In embodiments, "about," relates to values no more than 10% from a stated metric. When used in the context of a range, the modifier, "about," should also be considered as disclosing the range defined by the absolute values of the two endpoints. For example, the range, "from about 2 to about 4," also discloses the range, "from 2 to 4."

By, "negative additives that are negatively chargeable to a reference carrier," is meant that the additives are negatively charging relative to the toner surface measured by determining the toner triboelectric charge with or without the additive. Similarly, by, "positive additives that are positively chargeable to a carrier," is meant that the additives are positively charging relative to the toner surface measured by determining the toner triboelectric charge with and without the additive.

Negative additives that are negatively chargeable to a carrier include, for example, silica particles, alumina particles or any smaller sized particles (e.g., from about 7 to about 100 nm in volume average particle diameter as determined by any suitable technique) including, for example, polymeric microspheres, optionally treated with a composition rendering the particles negatively chargeable to a carrier on triboelectric contact therewith. The treating material may be, for example, a fluorosilane, for example such as exemplified in U.S. Pat. No. 4,973,540, incorporated herein by reference in entirety, other halogen-containing organosilanes such as described in U.S. Pat. No. 5,376,172, incorporated herein by reference in entirety, silazanes, siloxanes and the like.

By, "RH sensitivity," is meant a toner retains or comprises sufficient charge, particularly when exposed to higher humidity levels. The RH ratio is a useful metric for determining RH sensitivity. RH ratio generally is the ratio of charge, in µC/g, in the A Zone to that in the C zone, where the A zone generally comprises 28° C. and 85% RH and the C zone generally comprises 12° C. and 15% RH. The Q/M charging RH ratio for the developer can be quantified as the ratio of the toner Q/M in A-zone to the toner Q/M in C-zone measured under otherwise similar conditions. The RH ratio can also be measured as the ratio of the toner charge Q/D in A-zone to the toner Q/D in C-zone. Thus, the RH ratio defined in those ways generally takes a value from 0 if the charge in A-zone is zero, to a value of 1, if the charge in both zones is the same. Thus, a value of 0.5 RH ratio of Q/M would indicate the Q/M charge in A-zone was one-half the value in C-zone. In some instances the value of the RH ratio might be larger than 1, indicating that charge in A-zone is higher than charge in C-zone when measured under otherwise similar conditions, though this is not common. An RH ratio could in some situations be negative, indicating that the sign of the charge also changes with the change in environmental zones, which is also uncommon. It should be noted that other environmental zones may be used instead of A-zone and C-zone to define the RH ratio of the developer.

Carriers Resins

In embodiments, a carrier composition is disclosed comprising a polymer coating resin comprised of at least one vinyl monomer comprising an ester group comprising an aromatic electron delocalizing group, where the monomer has a carbon:oxygen (C/O) ratio of at least about 3, of at least about 4, at least about 5 or more.

The carrier resin may be an acrylate monomer or a methacrylate monomer. The carrier resin can have a Tg of between about 80° C. to 140° C. and may further include a toner additive. In embodiments, the toner additive comprises a silica. In embodiments, the additive is a conductive material, such as, a colorant, such as, a black colorant.

Such resins as described possess an energy gap for forward charge transfer of an electron from the monomer to the toner additive that is lower than the energy gap for reverse charge transfer of an electron from the toner additive to the monomer.

In embodiments, the gap for forward charge transfer of electrons for said monomer is less than about 5 eV, less than about 4.9 eV, less than about 4.8 eV, less than about 4.7 eV, less than about 4.6 eV or lower, including that the gap for reverse charge transfer of electrons from said toner additive is greater than greater than that of the forward charge.

In embodiments, the resin has the highest occupied molecular orbital (HOMO) electron density substantially located on a hydrophobic group, and the HOMO electron density located on the carbonyl function of the ester-containing monomer is effectively reduced.

In embodiments, an ester-containing monomer comprises an aromatic electron delocalizing group, which comprises, a single ring compound, a multiring compound, a polycyclic compound, a fused ring compound, a macrocyclic compound and so on. The or at least one ring can be a heterocycle, where one or more of the carbon atoms is replaced by, for example, N, S, Si, B, P, O and so on. In embodiments, the electron delocalizing group comprises, but is not limited to a phenyl group, a benzyl group, a thiopyranyl group, a pyridinyl group, a pyranyl group and so on.

In embodiments, the aromatic ring can be substituted on one or more of the ring carbon atoms by a heteroatom group, X, where X may be halogen, such as, I, Br, Cl or F, alkoxy from $C_1$-$C_{10}$, such as, methoxy, hydroxyl, thiol, amine and the like.

In embodiments, the coating resin may further include a second amino acrylate Monomer. Such second amino acrylate monomers include, but are not limited to, dimethylaminoethyl methacrylate (DMAEMA), diethylaminoethyl methacrylate and diethylaminopropyl methacrylate. The secondary amino acrylate monomers may be present from about 0.5 to about 1%, from about 1 to about 1.5%, from about 1.5 to about 2% by weight of the resin.

In embodiments, the carrier resin may be mixed in proportions of from about 30 to about 70 wt % to about 70 to about 30 wt %, from about 40 to about 60 wt % to about 60 to about 40 wt %. The coating may have a coating weight of, for example, from about 0.1 to about 5% by weight of the carrier, from about 0.5 to about 2% by weight of the carrier.

In embodiments, the carrier resin polymer may optionally be copolymerized with any desired comonomer, so long as the resulting copolymer retains suitable charge transfer and RH sensitivity properties. Suitable comonomers can include monoalkyl or dialkyl amines, such as, a dimethylaminoethyl methacrylate, diethylaminoethyl methacrylate, diisopropylaminoethyl methacrylate, t-butylaminoethyl methacrylate and the like. Another suitable comonomer is cyclohexyl methacrylate.

Toners

In embodiments, a developer is disclosed including a coated carrier comprising a resin comprising at least one monomer comprising at least one ester group, where the ester comprises an electron delocalizing aromatic group, and a toner, where the toner may be an emulsion aggregation toner, comprising a latex resin, an optional colorant, an optional wax and an optional polymer shell.

In embodiments, the latex resin may be composed of a first and a second monomer composition. Any suitable monomer or mixture of monomers may be selected to prepare the first monomer composition and the second monomer composition. The selection of monomer or mixture of monomers for the first monomer composition is independent of that for the second monomer composition, and vice versa. Exemplary monomers for the first and/or the second monomer compositions include, but are not limited to, styrene, alkyl acrylate such as methyl acrylate, ethyl acrylate, butyl acrylate, isobutyl acrylate, dodecyl acrylate, n-octyl acrylate, 2-chloroethyl acrylate; β-carboxy ethyl acrylate (β-CEA), phenyl acrylate, methyl α-chloroacrylate, methyl methacrylate, ethyl methacrylate and butyl methacrylate; butadiene, isoprene; methacrylonitrile, acrylonitrile; vinyl ethers, such as, vinyl methyl ether, vinyl isobutyl ether, vinyl ethyl ether and the like; vinyl esters, such as, vinyl acetate, vinyl propionate, vinyl benzoate, vinyl butyrate; vinyl ketones, such as, vinyl methyl ketone, vinyl hexyl ketone, methyl isopropenyl ketone and the like; vinylidene halides, such as, vinylidene chloride, a polyester, vinylidene chlorofluoride and the like; N-vinyl indole, N-vinyl pyrrolidene and the like; methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and the like, and mixtures thereof. In case a mixture of monomers is used, typically the latex polymer will be a copolymer.

In some embodiments, the first monomer composition and the second monomer composition may independently of each other comprise two or three or more different monomers. The latex polymer therefore comprises a copolymer. Illustrative examples of such a latex copolymer include poly(styrene-n-butyl acrylate-β-CEA), poly(styrene-alkyl acrylate) poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylononitrile), and the like.

In embodiments, the first monomer composition and the second monomer composition may be substantially water insoluble, generally hydrophobic, and may be readily dispersed in the aqueous phase with adequate stirring when added to a reaction vessel.

The weight ratio between the first monomer composition and the second monomer composition may be generally in the range of from about 0.1:99.9 to about 50:50, from about 0.5:99.5 to about 25:75, from about 1:99 to about 10:90.

Examples of the first/second monomer composition may be a mixture composing styrene and alkyl acrylate, such as, a mixture comprising styrene, n-butyl acrylate and β-CEA. Based on total weight of the monomers, styrene may generally be present in an amount from about 1% to about 99%, from about 50% to about 95%, from about 70% to about 90%, although may be present in greater or lesser amounts, alkyl acrylate, such as, n-butyl acrylate, may generally be present in an amount from about 1% to about 99%, from about 5% to about 50%, from about 10% to about 30%, although may be present in greater or lesser amounts.

In embodiments, a suitable resin is a polyester. Suitable polyester resins include, for example, those which are sulfonated, non-sulfonated, crystalline, amorphous, combinations thereof and the like. The polyester resins may be linear, branched, crosslinked, combinations thereof and the like.

Polyester resins may include those described, for example, in U.S. Pat. Nos. 6,593,049; 6,830,860; 7,754,406; 7,781,138; 7,749,672; and 6,756,176, the disclosure of each of which hereby is incorporated by reference in entirety.

When a mixture is used, such as, amorphous and crystalline polyester resins, the ratio of crystalline polyester resin to amorphous polyester resin may be in the range from about 1:99 to about 30:70; from about 5:95 to about 25:75; in embodiments, from about 5:95 to about 15:95. Plural amorphous resins can be used, for example, one with a lower molecular weight and one with a higher molecular weight.

A polyester resin may be obtained synthetically, for example, in an esterification reaction involving a reagent comprising carboxylic acid groups and another reagent comprising alcohol groups. Reagents comprising three or more functional groups enable, promote or enable and promote polymer branching and crosslinking.

Examples of polyacids or polyesters that may be used for preparing an amorphous polyester resin include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The polyacid or polyester reagent may be present, for example, in an amount from about 40 to about 60 mole % of the resin, from about 42 to about 52 mole % of the resin, from about 45 to about 50 mole % of the resin, and optionally a second polyacid can be used in an amount from about 0.1 to about 10 mole % of the resin.

Examples of polyols which may be used in generating an amorphous polyester resin include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol, and combinations thereof. The amount of polyol may vary, and may be present, for example, in an amount from about 40 to about 60 mole % of the resin, from about 42 to about 55 mole % of the resin, from about 45 to about 53 mole % of the resin, and a second polyol may be used in an amount from about 0.1 to about 10 mole %, in embodiments, from about 1 to about 4 mole % of the resin.

Polycondensation catalysts may be used in forming the amorphous (or crystalline) polyester resin, and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide, or combinations thereof. Such catalysts may be used in amounts of, for example, from about 0.01 mole % to about 5 mole % based on the starting polyacid or polyester reagent(s) used to generate the polyester resin.

In embodiments, the resin may be a crosslinkable resin. A crosslinkable resin is a resin including a crosslinkable group or groups, such as, a C=C bond or a pendant group or side group, such as, a carboxylic acid group. The resin may be crosslinked, for example, through a free radical polymerization with an initiator.

Examples of amorphous resins which may be used include alkali sulfonated-polyester resins, branched alkali sulfonated-polyester resins, alkali sulfonated-polyimide resins and branched alkali sulfonated-polyimide resins. Alkali sulfonated polyester resins may be useful in embodiments, such as, the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, a lithium or a potassium ion.

In embodiments, an unsaturated amorphous polyester resin may be used as a latex resin. Examples of such resins include those disclosed in U.S. Pat. No. 6,063,827, the disclosure of which is hereby incorporated by reference in entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate) and combinations thereof.

For forming a crystalline polyester resin, suitable organic polyols include aliphatic polyols with from about 2 to about 36 carbon atoms, such as, 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like, including structural isomers thereof. The aliphatic polyol may be, for example, selected in an amount from about 40 to about 60 mole %, from about 42 to about 55 mole %, from about 45 to about 53 mole %, and optionally, a second polyol may be used in an amount from about 0.1 to about 10 mole %, from about 1 to about 4 mole % of the resin.

Examples of polyacid or polyester reagents for preparing a crystalline resin include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid (sometimes referred to herein, in embodiments, as cyclohexanedioic acid), malonic acid and mesaconic acid, a polyester or anhydride thereof; and an alkali sulfo-organic polyacid, such as, the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalate acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate or mixtures thereof. The polyacid may be selected in an amount of, for example, from about 40 to about 60 mole %, from about 42 to about 52 mole %, from about 45 to about 50 mole %, and optionally, a second polyacid may be selected in an amount from about 0.1 to about 10 mole % of the resin.

Specific crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly-(2,2-dimethylpropane-1,3-diol-decanoate)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylene-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipatenonylene-deconoate), poly(octylene-adipate), and so on, wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octyleneadipamide), poly(etylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

Suitable crystalline resins which may be utilized, optionally, in combination with an amorphous resin as described above, include those disclosed in U.S. Pub. No. 2006/0222991, the disclosure of which is hereby incorporated by reference in entirety.

In embodiments, a suitable crystalline resin may include a resin formed of ethylene glycol and a mixture of dodecanedioic acid and fumaric acid comonomers.

Any suitable surfactant may be used for the preparation of latex, pigment and wax dispersions according to the present disclosure. Depending on the emulsion system, any desired nonionic or ionic surfactant, such as an anionic or cationic surfactant may be contemplated. Surfactants may be employed in any desired or effective amount, generally at least about 0.01% by weight of total monomers, at least about 0.1% by weight of total monomers used to prepare the latex polymer, and, for example, no more than about 10% by weight of total monomers used to prepare the latex polymer, no more than about 5% by weight of total monomers used to prepare the latex polymer, although the amount can be outside of those ranges.

Examples of suitable anionic surfactants include, but are not limited to, sodium dodecylsulfate, sodium dodecylbenzene sulfonate, sodium dodecylnaphthalenesulfate, dialkyl benzenealkyl sulfates and sulfonates, abitic acid, NEOGEN R® and NEOGEN SC® available from Kao, Tayca Power®, available from Tayca Corp., DOWFAX®, available from Dow Chemical Co., and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$-trimethyl ammonium bromides, halide salts of quaternized polyoxyethylalkylamines, dodecylbenzyl triethyl ammonium chloride, MIRAPOL® and ALKAQUAT® available from Alkaril Chemical Co., SANIZOL® (benzalkonium chloride, available from KAO Chemicals), and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy)ethanol (available from sanofi as IGEPAL CA-210®, IGEPAL CA-520®, IGEPAL CA-720®, IGEPAL CO-890®, IGEPAL CO-720®, IGEPAL CA-210®, ANTAROX 890® and ANTAROX 897®), and the like, as well as mixtures thereof.

Any suitable initiator or mixture of initiators may be selected in the latex process and the toner process according to the present disclosure. In typical embodiments, the initiator is selected from various known free radical polymerization initiators. The free radical initiator can be any free radical polymerization initiator capable of initiating a free radical polymerization process, and mixtures thereof, typically free radical initiators capable of providing free radical species upon heating to above about 30° C.

Examples of suitable free radical initiators include, but are not limited to, peroxides such as ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate, tetralin hydroperoxide, 1-phenyl-2-methylpropyl-1-hydro-peroxide, tert-butylhydroperoxide pertriphenylacetate, tert-butyl performate, tert-butyl peracetate, tert-butyl perbenzoate, tert-butyl perphenylacetate, tert-butyl permethoxyacetate, and tert-butyl per-N-(3-toluyl)carbamate; azo compounds such as 2,2'-azobispropane, 2-2'-dichloro-2-2'-azobispropane, 1,1'-azo(methylethyl)diacetate, 2,2'-azobis(2-amidinopropane) hydrochloride, 2,2'-azobis(2-amidinopropane)-nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonod-nitrile, 4-4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol A-4,4'-azobis-4-cyanopentano-ate), poly(tetraethylene glycol-2,2'-azobisisobutyrate); 1,4-bis(pentaethylene)-2-tetrazene, 1,4-dimethoxycarbonyl-1,4-dipheny-1-2-tetrazene; and the like; and mixtures thereof.

More typical free radical initiators include, but are not limited to, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate and the like.

Based on total weight of the monomers to be polymerized, the initiator may generally be present in an amount from about 0.1% to about 5%, from about 0.4% to about 4%, from about 0.5% to about 3%, although may be present in greater or lesser amounts.

A chain transfer agent optionally may be used to control the polymerization degree of the latex, and thereby control the molecular weight and molecular weight distribution of the product latexes of the latex process and/or the toner process according to the present disclosure. As a skilled artisan can appreciate, typically, the chain transfer agent becomes part of the latex polymer.

In embodiments, the chain transfer agent has a carbon-sulfur covalent bond. The carbon-sulfur covalent bond has usually absorption peak in a wave number region ranging from 500 to 800 cm$^{-1}$ in an infrared absorption spectrum. When the chain transfer agent is incorporated into the latex and the toner made from the latex, the absorption peak may be changed, for example, to a wave number region of 400 to 4,000 cm$^{-1}$.

Exemplary chain transfer agents include, but are not limited to, n-$C_{3-15}$ alkylmercaptans such as n-propylmercaptan, n-butylmercaptan, n-amylmercaptan, n-hexylmercaptan, n-heptylmercaptan, n-octylmercaptan, n-nonylmercaptan, n-decylmercaptan, and n-dodecylmercaptan; branched alkylmercaptans such as isopropylmercaptan, isobutylmercaptan, s-butylmercaptan, tert-butylmercaptan, cyclohexylmercaptan, tert-hexadecylmercaptan, tert-laurylmercaptan, tert-nonylmercaptan, tert-octylmercaptan, and tert-tetradecylmercaptan; aromatic ring-containing mercaptans such as allylmercaptan, 3-phenylpropylmercaptan, phenylmercaptan, and mercaptotriphenylmethane. As a skilled artisan understands, the term, "mercaptan," and, "thiol," may be used interchangeably to mean C—SH group.

Typical examples of such chain transfer agents also include, but are not limited to, dodecanethiol, butanethiol, isooctyl-3-mercaptopropionate, 2-methyl-5-t-butyl-thiophenol, carbon tetrachloride, carbon tetrabromide, and the like.

Based on total weight of the monomers to be polymerized, the chain transfer agent may generally be present in an amount from about 0.1% to about 7%, from about 0.5% to about 6%, from about 1.0% to about 5%, although may be present in greater or lesser amounts.

In various embodiments, a branching agent optionally may be included in the first/second monomer composition to control the branching structure of the target latex. Exemplary branching agents include, but are not limited to, decanediol diacrylate (ADOD, shin-Nakamura Co., JP), trimethylolpropane, pentaerythritol, trimellitic acid, pyromellitic acid and mixtures thereof.

Based on total weight of the monomers to be polymerized, the branching agent may generally be present in an amount from about 0% to about 2%, from about 0.05% to about 1.0%, from about 0.1% to about 0.8%, although may be present in greater or lesser amounts.

In the latex process and toner process of the disclosure, emulsification may be done by any suitable process, such as, mixing at elevated temperature. For example, the emulsion mixture may be homogenized at from about 200 to about 400 rpm and at a temperature of from about 40° C. to about 80° C. from about 1 min to about 20 minutes.

Any type of reactor may be suitably used without restriction. The reactor should include means for stirring the compositions therein. Typically, the reactor includes at least one impellar. For forming the latex and/or toner, the reactor is preferably operated throughout the process such that the impellers can operate at an effective mixing rate of about 10 to about 1,000 rpm.

Following completion of the monomer addition, the latex may be permitted to stabilize by maintaining the conditions for a period of time, for example, for about 10 to about 300 minutes, before cooling. Optionally, the latex formed by the above process may be isolated by standard methods known in the art, for example, coagulation, dissolution and precipitation, filtration, washing, drying or the like.

The latex of the present disclosure may be selected for emulsion/aggregation/coalescence processes for forming toners, inks and developers by known methods.

The latex of the present disclosure may be melt blended or otherwise mixed with various toner ingredients, such as, an optional wax dispersion, a coagulant, an optional silica, an optional charge enhancing additive or charge control additive, an optional surfactant, an optional emulsifier, an optional flow additive and the like. Optionally, the latex (e.g. around 40% solids) may be diluted to the desired solids loading (e.g. around 12 to 15% by weight solids), before formulated into the toner.

Based on the total toner weight, the latex may generally be present in an amount from about 50% to about 100%, from about 60% to about 98%, from about 70% to about 95%, although may be present in greater or lesser amounts. Methods of producing such latex resins may be carried out as described in the disclosure of U.S. Pat. No. 7,524,602, herein incorporated by reference in entirety.

Colorants

Various known suitable colorants, such as dyes, pigments, mixtures of dyes, mixtures of pigments, mixtures of dyes and pigments, and the like, may be included in the toner. The colorant may be included in the toner in an amount of, for example, 0 to about 35% by weight of the toner, from about 1 to about 15 wt % of the toner, from about 3 to about 10% by weight of the toner, although amounts outside those ranges may be utilized.

As examples of suitable colorants, mention may be made of carbon black, such as, REGAL 330®; magnetites, such as Mobay magnetites MO8029™, MO8060™; Columbian magnetites; MAPICO BLACKS™ and surface-treated magnetites; Pfizer magnetites, CB4799™, CB5300™, CB5600™ or MCX6369™; Bayer magnetites, BAYFERROX 8600™ or 8610™; Northern Pigments magnetites, NP-604™ or NP-608™; Magnox magnetites, TMB-100™ or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water-based pigment dispersions.

Specific examples of pigments include SUNSPERSE 6000, FLEXIVERSE and AQUATONE water-based pigment dispersions from Sun Chemicals, HELIOGEN BLUE L6900™, D6840™, D7080™, D7020™, PYLAM OIL BLUE™, PYLAM OIL YELLOW™ or PIGMENT BLUE 1™ available from Paul Uhlich & Co., Inc., PIGMENT VIOLET 1™, PIGMENT RED 48™, LEMON CHROME YELLOW DCC 1026™, E.D. TOLUIDINE RED™ and BON RED C™ available from Dominion Color Corp., Ltd., Toronto, Calif., NOVAPERM YELLOW FGL™, HOSTAPERM PINK E™ from sanofi, and CINQUASIA MAGENTA™ available from E.I. DuPont de Nemours & Co., and the like. Generally, colorants that can be selected are black, cyan, magenta or yellow, and mixtures thereof.

Examples of magentas are 2,9-dimethyl-substituted quinacridone and anthraquinone dye identified in the Color Index (CI) as CI 60710, CI Dispersed Red 15, diazo dye identified in the Color Index as CI 26050, CI Solvent Red 19 and the like.

Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137 and the like.

Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL.

Colored magnetites, such as, mixtures of MAPICO BLACK™, and cyan components also may be selected as colorants. Other known colorants can be selected, such as, Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (sanofi), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (sanofi), Permanent Yellow YE 0305 (Paul Uhlich), Lumogem Yellow D0790 (BASF), Sunsperse Yellow YHD 6001 (Sun Chemicals), Suco-Gelb L1250 (BASF), Suco-Yellow D1355 (BASF), Hostaperm Pink E (sanofi), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann, CA), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like.

Wax

In addition to the polymer resin, the toners of the present disclosure also contain a wax, which can be either a single type of wax or a mixture of two or more different waxes. A single wax can be added to toner formulations, for example, to improve particular toner properties, such as, toner particle shape, presence and amount of wax on the toner particle surface, charging and/or fusing characteristics, gloss, stripping, offset properties and the like. Alternatively, a combination of waxes can be added to provide multiple properties to the toner composition.

When included, the wax may be present in an amount of, for example, from about 1 wt % to about 25 wt % of the toner particles, from about 5 wt % to about 20 wt % of the toner particles. The wax can have a melting point less than about 30° C., less than about 35° C., less than about 40° C.

Waxes that may be selected include waxes having, for example, a weight average molecular weight (Mw) of from about 500 to about 20,000, from about 1,000 to about 10,000. Waxes that may be used include, for example, polyolefins, such as, polyethylene, polypropylene, and polybutene waxes, such as, commercially available from Allied Chemical and Petrolite Corp., for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K.K.; plant-based waxes, such as, carnauba wax, rice wax, candelilla wax, sumacs wax and jojoba oil; animal-based waxes, such as, beeswax, mineral-based waxes and petroleum-based waxes, such as, montan wax, ozokerite, ceresin, paraffin wax, microcrystalline wax and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate and pentaerythritol tetra behenate; ester waxes obtained from higher fatty acid and multivalent alcohol multimers, such as, diethyleneglycol monostearate, dipropyleneglycol distearate, diglyceryl distearate, and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™ or SUPERSLIP 6530™ available from Micro Powder Inc., fluorinated waxes, for example POLYFLUO 190™, POLYFLUO 200™, POLYSILK 19™ or POLYSILK 14™ available from Micro Powder Inc., mixed fluorinated, amide waxes, for example, MICROSPERSION 19™ also available from Micro Powder Inc., imides, esters, quaternary amines, carboxylic acids or acrylic polymer emulsion, for example, JONCRYL 74™, 89™, 130™, 537™, and 538™, all available from SC Johnson Wax, and chlorinated polypropylenes and polyethylenes available from Allied Chemical and Petrolite Corp. and SC Johnson Wax. Mixtures and combinations of the waxes also may be used. Waxes may be included as, for example, fuser roll release agents.

Toner Preparation

The toner particles may be prepared by any method within the purview of one skilled in the art. Although embodiments relating to toner particle production are described below with respect to emulsion-aggregation (EA) processes, any suitable method of preparing toner particles may be used, including chemical processes, such as suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which smaller sized resin particles are aggregated to the appropriate toner particle size and then coalesced to achieve the final toner particle shape and morphology.

In embodiments, toner compositions may be prepared by EA processes, such as, a process that includes aggregating a mixture of an optional wax and any other desired or required additives, and emulsions including the resins described above, optionally in surfactants as described above, and then coalescing the aggregated particle mixture. A mixture may be prepared by adding an optional wax or other materials, which may also be optionally in a dispersion(s) including a surfactant, to the emulsion, which may be a mixture of two or more emulsions containing the resin. The pH of the resulting mixture may be adjusted by an acid (i.e., a pH adjuster) such as, for example, acetic acid, nitric acid or the like, or a buffer. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute (rpm). Homogenization may be accomplished by any suitable means, including, for example, an IKA ULTRA TURRAX T50 probe homogenizer.

Following the preparation of the above mixture, an aggregating agent may be added to the mixture. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1 parts per hundred (pph) to about 1 pph, from about 0.25 pph to about 0.75 pph.

The gloss of a toner may be influenced by the amount of retained metal ion, such as, $Al^{3+}$, in the particle. The amount of retained metal ion may be further adjusted by the addition of a chelator/buffer, such as, EDTA. In embodiments, the amount of retained metal ion, for example $Al^{3+}$, in toner particles of the present disclosure may be from about 0.1 pph to about 1 pph, from about 0.25 pph to about 0.8 pph.

To control aggregation and coalescence of the particles, in embodiments the aggregating agent may be metered into the mixture over time. For example, the agent may be metered into the mixture over a period of from about 5 to about 240 minutes, from about 30 to about 200 minutes. The addition of the agent may also be done while the mixture is maintained under stirred conditions, in embodiments, from about 50 rpm to about 1,000 rpm, from about 100 rpm to about 500 rpm, and at a temperature that is below the Tg of the resin.

The particles may be permitted to aggregate until a predetermined desired particle size is obtained. Samples may be taken during the growth process and analyzed, for example with a COULTER COUNTER, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, from about hour 1 to about 5 hours, while maintaining stirring, to provide the aggregated particles. The predetermined desired particle size is within the toner particle size ranges mentioned above. In embodiments, the particle size may be from about 3 to about 8 μm, from about 4 to about 7 μm.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example, of from about 40° C. to about 90° C., from about 45° C. to about 80° C., which may be below the Tg of the resin.

Shell Resin

In embodiments, a shell may be applied to the formed aggregated toner Particles. Any resin described above as suitable for the core resin may be utilized as the shell resin. The shell resin may be applied to the aggregated particles by any method within the purview of those skilled in the art. In embodiments, the shell resin may be in an emulsion including any surfactant described above. The aggregated particles described above may be combined with said emulsion so that the resin forms a shell over the formed aggregates. In embodiments, an amorphous polyester may be utilized to form a shell over the aggregates to form toner particles having a core-shell configuration.

The optional shell component may be about 10 to about 30% by weight of the toner particles. A thicker shell may be desirable to provide better charging characteristics due to the higher surface area of the toner particle and the encapsulating function. Thus, the shell resin may be present in an amount of at least about 30% by weight of the toner, at least about 35%, at least about 40% by weight of the toner particles.

In embodiments, a photoinitiator may be included in the shell. Thus, the photoinitiator may be in the core, the shell, or both. The photoinitiator may be present in an amount of from about 1% to about 5% by weight of the toner particles, from about 2% to about 4% by weight of the toner particles.

Emulsions including these resins may have a solids loading of from about 5% solids by weight to about 20% solids by weight, from about 12% solids by weight to about 17% solids by weight.

Once the desired final size of the toner particles is achieved, the pH of the mixture may be adjusted with a base or a buffer to a value of from about 5 to about 10, from about 6 to about 8. The adjustment of the pH is to freeze, that is to stop, toner growth. The base utilized to stop toner growth may include any suitable base such as, for example, alkali metal hydroxides, such as, for example, sodium hydroxide, potassium hydroxide, ammonium hydroxide, combinations thereof and the like. In embodiments, a chelator or buffet, such as, ethylene diamine tetraacetic acid (EDTA) may be added to help adjust the pH to the desired values noted above. The base may be added in amounts from about 2 to about 25% by weight of the mixture, from about 4 to about 10% by weight of the mixture. In embodiments, the shell has a higher $T_g$ than the core particle.

Coalescence

Following aggregation to the desired particle size, with formation of an optional shell, the particles may then be coalesced to the desired final shape, the coalescence being achieved by, for example, heating the mixture to a temperature of from about 55° C. to about 100° C., from about 65° C. to about 75° C., which may be below the melting point of any crystalline resin present to prevent plasticization. Higher or lower temperatures may be used, it being understood that the temperature is a function of the resins used for the binder.

Coalescence may proceed and be accomplished over a period of from about 0.1 to about 9 hours, from about 0.5 to about 4 hours.

After coalescence, the mixture may be cooled to room temperature (RT), such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze drying.

Additives

In embodiments, the toner particles may also contain other optional additives, as desired or required. For example, the toner may include any known charge additives in amounts of from about 0.1 to about 10 wt %, from about 0.5 to about 7 wt % of the toner. Examples of such charge additives include alkyl pyridinium halides, bisulfates, the charge control additives of U.S. Pat. Nos. 3,944,493, 4,007,293, 4,079,014, 4,394,430 and 4,560,635, the disclosure of each of which hereby is incorporated by reference in entirety, negative charge enhancing additives like aluminum complexes and the like.

Surface additives can be added to the toner compositions of the present disclosure after washing or drying. Examples of such surface additives include, for example, metal salts, metal salts of fatty acids, colloidal silicas, metal oxides, strontium titanates, mixtures thereof and the like. Surface additives may be present in an amount of from about 0.1 to about 10 wt %, from about 0.5 to about 7 wt % of the toner. Examples of such additives include those disclosed in U.S. Pat. Nos. 3,590,000, 3,720,617, 3,655,374 and 3,983,045, the disclosure of each of which hereby is incorporated by reference in entirety. Other additives include zinc stearate and AEROSIL R972® available from Degussa. The coated silicas of U.S. Pat. Nos. 6,190,815 and 6,004,714, the disclosure of each of which hereby is incorporated by reference in entirety, can also be present in an amount of from about 0.05 to about 5%, from about 0.1 to about 2% of the toner, which additives can be added during aggregation or blended into the toner.

The characteristics of the toner particles may be determined by any suitable technique and apparatus. Volume average particle diameter $D_{50v}$, GSDv, and GSDn may be measured by means of a measuring instrument such as a Beckman Coulter MULTISIZER 3, operated in accordance with the instructions of the manufacturer. Toners produced in accordance with the present disclosure possess beneficial charging characteristics when exposed to extreme relative humidity (RH) conditions.

The gloss level of a toner, as measured using a Gardner device can be from about 20 gloss units (gu) to about 100 gu, from about 50 gu to about 95 gu.

In embodiments, toners of the present disclosure may be utilized as ultra low melt (ULM) toners. In embodiments, the dry toner particles, exclusive of external surface additives, may have the following characteristics:
  (1) circularity of from about 0.9 to about 1 (measured with, for example, a Sysmex 3000 analyzer), from about 0.95 to about 0.99, from about 0.96 to about 0.98;
  (2) glass transition temperature of from about 45° C. to about 60° C., from about 48° C. to about 55° C.; and
  (3) melt flow index (MFI) g/10 min (5 kg/130° C.) of from about 79.0 to about 172.5.

Carriers

The carrier particles may be prepared by mixing the carrier core with a polymer of interest in an amount from about 0.05 to about 10% by weight, from about 0.01% to about 5% by weight, based on the weight of the coated carrier particles, until adherence thereof to the carrier core by mechanical impaction and/or electrostatic attraction. In embodiments, the Tg of such carrier resin monomers is from about 80° C. to about 100° C., about 100° C. to about 140° C.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combination thereof, and the like. The mixture of carrier core particles and polymer may then be heated to enable the polymer to melt and to fuse to the carrier core particles using various effective means including a kiln or an extruder. The coated carrier particles may then be cooled and thereafter classified to a desired particle size.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Developers

The toner particles thus formed are formulated into a developer composition. The toner concentration in the developer may be from about 1% to about 25% by weight of the total weight of the developer, from about 2% to about 15% by weight of the total weight of the developer.

Imaging

The developers can be utilized for electrophotographic processes, including those disclosed in U.S. Pat. No. 4,295,990, the disclosure of which is hereby incorporated by reference in entirety. In embodiments, any known type of image development system may be used in an image developing device, including, for example, magnetic brush development, jumping single-component development, hybrid scavengeless development (HSD) and the like. Those and similar development systems are within the purview of those skilled in the art.

It is envisioned that the developers of the present disclosure may be used in any suitable procedure for forming an image with a developer, including in applications other than xerographic applications.

Utilizing the toners of the present disclosure, images may be formed on substrates, including flexible substrates, having a developer pile height of from about 1 μm to about 6 μm, from about 2 μm to about 4.5 μm.

Rational Design

In embodiments, a controller/central processing unit (CPU) may be used to design carrier resins and/or predict key attributes for resins.

In one embodiment, a method of designing carrier resins is disclosed including identifying a test polymer and modeling the surface of the polymer; identifying a test toner additive and modeling the surface of the toner additive; determining surface electron properties of the polymer and the toner additive using a density functional method, where the method determines structure calculations for local and gradient-dependent function; determining the initial structure, optimized structure and electronic properties of absorbed test polymer complexes on the toner additive; determining geometry optimization convergence for the absorbed polymer complexes on the toner additive, where the optimization is achieved when the energy, gradient, and displacement are lower than about $2\times10^{-5}$ Ha, about $4\times10^{-3}$ Ha/Å, and about $5\times10^{-3}$ Å, respectively; determining the likely direction of charge transfer between the polymer and toner additive by calculating the HOMO and LUMO for the polymer-toner additive complexes; determining Fukui functions for surface electron densities in HOMO and LUMO to describe the active sites of the donor-acceptor complexes in charge transfer; and determining the lowest energy gap for both forward electron transfer and reverse electron transfer, where when the reverse gap is higher than the forward gap for the adsorbed polymer complexes on the toner additive, the negative gap difference is predictive of high negative toner charge in charging of toner resins comprising the polymer-toner additive complexes.

Those of skill in the art will recognize that many of the functions and aspects of such a method may be implemented on a computer or computers. The hardware of such computer platforms typically is general purpose in nature, albeit with an appropriate network connection for communication via the intranet, the Internet and/or other data networks.

As known in the data processing and communications arts, each such general purpose computer typically comprises a central processor, an internal communication bus, various types of memory (RAM, ROM, EEPROM, cache memory etc.), disk drives or other code and data storage systems, and one or more network interface cards or ports for communication purposes. The computer system also may be coupled to a display and one or more user input devices, such as, alphanumeric and other keys of a keyboard, a mouse, a trackball and the like. The display and user element(s) together form a service-related user interface, for interactive control of the operation of the computer system. The user interface elements may be coupled locally to the computer system, for example, in a workstation configuration, or the user interface elements may be remote from the computer and communicate therewith via a network. The elements of such a general purpose computer system also may be combined with or built into routing elements or nodes of the network.

The software functionalities (e.g., many of the operations described above) involve programming of controllers, including executable code as well as associated stored data. The software code is executable by the general purpose computer that functions as the particular computer. In operation, the executable program code and possibly the associated data are stored within the general purpose computer platform. At other times, however, the software may be stored at other locations and/or transported for loading into the appropriate general purpose computer system. Hence, the embodiments involve one or more software products in the form of one or more modules of code carried by at least one machine-readable medium. Execution of such code by a processor of the computer platform enables the platform to implement the system or platform functions, in essentially the manner performed in the embodiments discussed and illustrated herein.

As used herein, terms such as controller or CPU or computer or machine readable medium refer to any medium that participates in providing instructions to a processor for execution. Such a medium may take many forms, including but not limited to, non-volatile media, volatile media and transmission media. Non-volatile media include, for example, optical or magnetic disks, such as, any of the storage devices in any computer(s). Volatile media include dynamic memory, such as, main memory of such a computer platform. Physical transmission media include coaxial cables; copper wire and fiber optics, including the wires that comprise a bus within a computer system. Carrier wave transmission media may take the form of electric or electromagnetic signals, or acoustic or light waves, such as, those generated during radio frequency (RF) and infrared (IR) data communications. Common forms of computer-readable media therefore include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer may read programming code and/or data. Many of those forms of computer readable media may be involved in carrying one or more sequences of one or more instructions to a processor for execution.

The following Examples are submitted to illustrate embodiments of the present disclosure. The Examples are intended to be illustrative only and are not intended to limit the scope of the present disclosure. Also, parts and percentages are by weight unless otherwise indicated.

EXAMPLES

Silica Charge with Carrier Resins

As stated above, there are problems in providing high charge with good RH sensitivity of charge to changing environmental conditions for carrier coating resin designs. For example, polymer resins such as poly(cyclohexyl methacrylate) (PCHMA) could be used as carrier coating resins to provide similar charge as such resins including poly(methyl methacrylate) (PMMA) coated resin, but with improved RH sensitivity.

In general, it seems that a higher carbon-to-oxygen (C/O) ratio exhibited by the monomer used in the carrier resin improves RH sensitivity, while still providing good charge. For example, increasing the amount of cyclohexylmethacrylate (CHMA) in copolymers of CHMA and PMMA, where the DMAEMA is kept constant at 1% in the copolymer, demonstrates that behavior. Thus, it was desirable to increase the carbon content of a resin, for example, by replacing a methyl group in PMMA with a cyclohexyl group to CHMA.

Thus, the above data shows that resins such as PMMA, PCHMA and copolymers containing DMAEMA monomer can provide acceptable charge levels with silica, at least under dry conditions. Under high RH conditions, a higher C/O ratio is desired.

Based on modeling studies, for excellent high negative toner charge in charging of toners with silica and carriers with a polymeric resin coating the following attributes are desirable:

1) the gap for forward charge transfer from the HOMO-n of the carrier resin to the LUMO+m on the toner silica additive should be low;
2) the reverse gap should be higher than the forward gap (a negative gap difference; subtracting (1) from (2));
3) the resin is comprised of a high C/O ratio monomer, which limits bulk water adsorption; and
4) the resin has the HOMO electron density located substantially on the hydrophobic group.

The first two conditions provide the requisite charge transfer and charge level, while the last two conditions improve the RH sensitivity of charge to water adsorption. To provide functional specification for the carrier coating resin materials that will provide high negative charge to silica on a toner surface and to provide a description of chemical functionality that will in addition provide an improved RH sensitivity, computer modeling was used to understand and define properties that are important, inter alia, to design (and predict properties of) new materials that have both high charge and good RH sensitivity.

Materials

Methacrylates with methyl, cyclohexyl, dimethylamino, phenyl, benzyl, thiopyranyl, pyridinyl and pyranyl substituents were studied. The 4-isomer was used in the cases of the heteroatom substituted monomers, for example, of the general formula as set forth in formula (I), including isomers thereof:

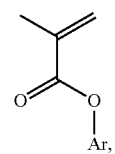

Formula (I)

wherein Ar includes, but is not limited to:

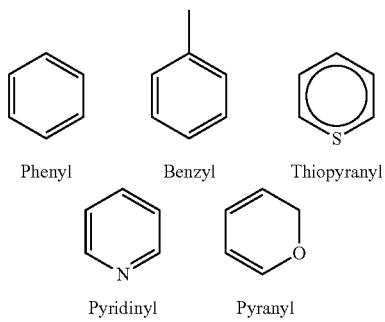

Phenyl   Benzyl   Thiopyranyl

Pyridinyl   Pyranyl and where heteroatoms were substituted at varying positions on the aromatic ring, where X=Fl, Cl, Br, I, methoxy, hydroxyl or thiol, and the like, at the 2, 3 or 4 position:

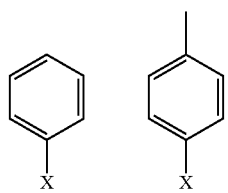

Modeling

For all substituted methacrylates, a trimer was used to represent the polymer to be examined. To distinguish possible effects of C (carbon) rich and O (oxygen) rich functional groups (alkyl/aromatic and acyl) in the polymer, all acyl groups were designed to coordinate to the same side.

To mimic the surface hydroxyl group of the silica model, a one layer cylinder-like silica model was used to design the surface-treated silicas with the formula, $Si_{12}O_{32}H_{16}$. In the model, all silicas were in terrahedral geometry and connected by oxygen. The edge of the cylinder was terminated by two hydroxyl groups to represent the geminal silanols [$Si(OH)_2$], which typically are on the surface of β-cristobalite, identified experimentally on the amorphous silica surface as one of the two types of surface hydroxyl group of untreated silica (see, e.g., Leonardelli, et al., J Am Chem Soc (1992) 114:6412; and Vigné-Maeder & Sautet, J Phys Chem (1997) 101 (41):8197, herein incorporated by reference in entirety). All calculations were performed with the DMol3 module from the Accelrys Materials Studio 4.2 commercial software package. Density functional theory (DFT) was used for the study of surface electronic properties of all models and the coupled toner/carrier complexes. Due to the main advantage of high accuracy at reasonable computational efficiency, the DFT method has been applied successfully to the electronic structure modeling of materials.

Recent extensions of the DMol3 density functional method are designed to do electronic structure calculations for local and gradient-dependent functional, depending on the accuracy needed. In the present modeling example, Perdew's 91 generalized gradient approximations (PW91PW91) were employed as the density functional method. For basis sets, a double numerical basis set with d-polarization functions (DND) was used for all calculations. Using DFT may require careful and extensive functional exploration. For different basis set types, it has been reported that DND performs better than a Guassian-type basis set of the same size, which is 6-31G*. The DND numerical solutions can give highly accurate DFT solutions for the separated atoms limit for molecular and solids calculations.

The initial structure, optimized structure and electronic properties of adsorbed polymer complexes on the silica were studied. The geometry optimization convergence was achieved when the energy, gradient and displacement were lower than $2 \times 10^{-5}$ Ha, $4 \times 10^{-3}$ Ha/Å and $5 \times 10^{-3}$ Å, respectively. Ha is the Hartree atomic units (au), where 1 au=$4.359 \times 10^{-18}$ Joules. The calculations of HOMO-LUMO orbitals were performed to understand the direction of charge transfer of the above models and to identify the most essential factor that could affect electron transfer in those complex models.

Electron transfer active sites on different materials are crucial to triboelectric charge as the root and destination of electron transfer and relative ability of donating and accepting electrons will directly determine the triboelectric charge properties of certain toner/charger pairs. Generated surface electron densities in HOMO and LUMO are used to describe the active sites of the donor-acceptor complex in charge transfer.

To quantitatively analyze electron density shift to hydrophobic substituent of the instant polymer resins, the % contributions of each atomic orbital (AO) to a particular molecular orbital (MO) using Mulliken partitioning was calculated with DMol3 module. Then, the contribution of AO's on the hydrophobic part to HOMO of each novel polymer resin was integrated to compare the electron density delocalization on different hydrophobic substituents. The hydrophilic and hydrophobic part of methacrylate resins were distinguished where COO is hydrophilic, as are the other heteroatoms and attached carbon atoms, all other carbon atoms are hydrophobic.

Results

The key attributes for high negative toner charge from modeling are as follows:
1) the gap for the forward charge transfer should be low;
2) the reverse gap should be higher than the forward gap (a negative gap difference, subtracting (1) from (2));
3) the resin has a high C/O ratio monomer;
4) the Tg of the resin must be relatively high; and
5) the water adsorption at the charging site must be low.

Attributes (1) and (2): The Gap for the Forward Charge Transfer Needs to be Low and the Reverse Gap Should be Higher than the Forward Gap (Negative Gap Difference)

To model electron transfer from the carrier coating resin to the silica toner additive, a carrier resin silica complex was studied, comprising a trimer unit of the carrier resin and a silica surface model.

In intramolecular electron transfer within a single material, the adsorption of sufficient energy from a photon or collision or thermal energy can result in transfer of an electron from the HOMO to the LUMO. Since the electron and hole (left when the electron leaves the HOMO) are both on the same molecule, there is no net charge change on the molecule. The size of the energy gap determines the amount of energy required to transfer the electron between the orbitals. Thus, both the carrier resin, for example, and toner additive before in contact have a HOMO and a LUMO and an associated gap. It should be noted that there are also potentially other energy levels above the LUMO (known as LUMO+1, LUMO+2 etc. of increasing energy) and below HOMO (known as HOMO-1, HOMO-2 etc. of decreasing energy). So, in general, it is possible to transfer an electron from a HOMO-n to a LUMO+m, where n, m≥0 within a material. Note HOMOn=0 is usually written as HOMO and LUMOm=0 as LUMO for simplicity.

From the computer modeling work, it has been shown that on contact of two materials, such as, between the toner additive and the carrier, that a number of different possibilities arise for the location of HOMO-n and the LUMO+m, and thus the result of charge transfer has a number of different possibilities. The contact of the two materials may result in the HOMO-n being located on the carrier resin and LUMO+m on the toner additive. In that situation, the electron transfer will charge the carrier resin positive and the toner additive negative (desired transfer for negative charging toner). On the other hand, if the LUMO+m is located on the carrier resin and the HOMO-n is on the toner additive, the electron transfer will charge the toner additive positive and the carrier resin negative (undesired transfer for negative charging toner). Of course, the HOMO and LUMO may be located on just one molecule or could be partially on both molecules. The disposition of the frontier molecular orbitals is a consequence of the properties of the two materials and interaction therebetween, that interaction also depending on the orientation of the two molecules in contact. In a bulk sample of material, different orientations of the molecules in contact will be obtained randomly. So, the overall charge transferred is the sum of those different processes. Fortunately, the important processes for charge transfer will be that of the lowest energy, so in the collection of the modeling data the process is to look at different orientations of contact and to identify the lowest energy gap for the forward charge transfer desired (e.g., negative toner charge) and lowest energy gap for reverse charge transfer (i.e., positive toner charge).

Thus, modeling shows that for high negative toner charge in the charging of toners with silica and carriers with a polymeric resin coating there are two attributes:

1) the gap for the forward charge transfer should be low; and
2) the reverse gap should be higher than the forward gap (a negative gap difference, subtracting (1) from (2)).

Table 1 below shows data for electron charge transfer to silica (desirable) to electron charge transfer to a polymer (not desirable) for a number of different coating materials. MMA is methylmethacrylate; PhMA is phenylmethacrylate; BMA is benzylmethacrylate; and MA is methacrylate.

While not wanting to be bound by theory, that seems to be the result of DMEAMA having a much lower intrinsic energy gap for forward transfer, and thus is an extremely effective material for increasing charge. A charge increase was noted in DMAEMA/CHMA for even only a 1% loading of the amine comonomer into the copolymer coating. In those cases, the energy for reverse transfer is higher and thus, not favored. As such, the energy gap calculation data is a good predictor for observed values.

PhMA, pyridinyl MA and pyranyl MA have about the same forward energy gap (4.7, 4.8, and 4.8 eV, respectively), with much higher reverse gaps, and thus, will have good charging (e.g., similar to CHMA). Thiopyranyl MA has a lower energy gap of 4.5 eV, and thus provides higher charge than the other molecules. Benzyl MA has a higher energy gap of 5.0 eV and thus will provide somewhat lower, though still good charging. Similarly, 4-chlorophenyl MA, 4-fluorophenyl MA, 4-iodophenyl MA, 3-methoxybenzyl MA, 2-methoxybenzyl MA, 2-hydroxybenzyl MA, and 4-thiobenzyl MA, also have lower forward energy gaps, with much higher reverse gaps, and thus provide higher charge than MMA and CHMA. By varying the aromatic substituent, charge may be moved up or

TABLE 1

Data for Charge Transfer

|  | Charge Transfer Polymer to Silica (eV) | Charge Transfer Silica to Polymer (eV) | Positive Charge Prediction | Measured Charging | C/O Ratio | HOMO Delocalization on Hydrophobic Group | Measured RH Ratio |
|---|---|---|---|---|---|---|---|
| MMA | 4.8 | 6.2 | Good | Good | 2.5 | 16% | Worse than CHMA |
| CHMA | 4.7 | 6.5 | Good | Good | 5.0 | 21% | Good |
| CHMA/ DMAEMA | 4.3 | 6.3 | Good-higher | Good-higher | 5 |  | Worse than CHMA as more DMAEMA added |
| DMAEMA | 3.7 | 5.2 | Excellent-very high |  | 4 | 24% |  |
| PhMA | 4.7 | 5.659 | Good |  | 5 | 84% |  |
| BMA | 5.0 | 5.358 | Good-lower |  | 5.5 | 48% |  |
| ThiopyranylMA | 4.5 | 5.5 | Good-higher |  | 5 | 43% |  |
| Pyridinyl MA | 4.8 | None* | Good |  | 5 | 16% |  |
| Pyranyl MA | 4.8 | 5.9 | Good |  | 3 | 65% |  |
| 4-chlorophenyl MA | 4.6 | 5.5 | Good-higher |  | 5 |  |  |
| 4-fluorophenyl MA | 4.6 | 5.5 | Good-higher |  | 5 |  |  |
| 4-iodophenyl MA | 4.3 | 5.3 | Good-higher |  | 5 |  |  |
| 3-methoxybenzyl MA | 4.4 | 5.1 | Good-higher |  | 4 |  |  |
| 2-methoxybenzyl MA | 4.4 | 5.2 | Good-higher |  | 4 |  |  |
| 2-hydroxybenzyl MA | 4.4 | 5.2 | Good-higher |  | 3.67 |  |  |
| 4-thiobenzyl MA | 4.2 | 5.1 | Good-higher |  | 5.5 |  |  |

*None found even to excited state levels of LUMO + 8 and Homo-9

The data show that polymers based on MMA, CHMA and DMAEMA/CHMA have good charging as all have a charge transfer gap for forward transfer that is about equal to or lower than that of MMA. The calculation for DMAEMA/CHMA shows a lower gap and thus higher charging as observed.

down as required or desired. Other isomers are possible and may also be modeled according to the instant disclosure, which additional isomers may provide drivers to move charge levels, including molecules comprising additional heteroatoms (e.g., two sulfurs).

Attribute (3): Carbon to Oxygen Ratio

The MMA C/O ratio is low at 2.5 and MMA has poor RH sensitivity. CHMA has a C/O ratio of 5 and improved RH ratio. DMAEMA has a C/O ratio of 4 and thus can degrade RH sensitivity. Thus, DMAEMA can be used in smaller amounts to maintain the best RH sensitivity. Hexyl methacrylate and phenyl methacrylate have a higher C/O ratio of 5, similar to that of CHMA, and thus, should also provide a good RH ratio. Phenyl acrylate has been used as a potential carrier coating resin (see, e.g., U.S. Pat. No. 6,511,780, herein incorporated by reference in entirety), however, phenyl acrylate has a lower C/O ratio (4.5) as compared to CHMA, and therefore is not expected to provide as good RH sensitivity as the phenyl methacrylate. Indeed, all things being equal, the C/O ratio and thus RH sensitivity, will show greater improvement for a methacrylate as compared to the acrylate analogue. Benzyl methacrylate has the highest C/O ratio (i.e., 5.5), and therefore is expected to provide even greater RH sensitivity than does CHMA.

Attribute (4): Glass Transition (Tg) Temperature of the Resin

In the carrier powder coating process, the Tg of the coating resin must be low enough to coat at elevated temperatures (200° C. is a typical coating temperature) but high enough so that the resin does not flow under normal transportation and shipping temperatures, nor flow under the conditions encountered in an operating printer. Since the developer can potentially reach 55-60° C., it is desirable Tg to be considerably higher than those temperatures. PMMA and CHMA have a high Tg of 100° C. A range of Tg from about 80° to about 140° C. is acceptable. Polyphenyl methacrylate (PPHMA or PPhMA) has a Tg of about 110° C., and polybenzyl methacrylate (PBMA), about 54° C., where the lower Tg (a result of the greater flexibility of the benzyl side group) makes PBMA unsuitable as a homopolymer. However, BMA may be used in a copolymer with a higher Tg possessing monomer. Replacing carbon atoms in the aromatic group with S, N, or O may increase Tg slightly due to an increase in polarity. Methacrylates are preferred over acrylates as acrylates have much lower Tg values and thus are generally unsuitable, unless in combination with a higher Tg component in the carrier resin.

Attribute (5): Water Adsorption at the Charging Site

Another key attribute is for the HOMO electron density to be located substantially on a hydrophobic group of the resin. The amount of electron density on each atom of a variety of molecules was calculated in the HOMO of the isolated trimer. The % on the hydrophobic group was calculated as the % of the electron density on carbon that is not directly attached to a heteroatom; all other carbon atoms attached to a heteroatom, or the heteroatoms are counted as hydrophilic. Thus, if the HOMO electron density is on a heteroatom or a carbon atom attached to a heteroatom, the site will be polar. Polar groups preferentially attract water. Thus, a charging site on a hydrophilic group will be very sensitive to water. On the other hand, electron density on a non-polar and thus hydrophobic carbon atom will not attract water as readily and therefore will be more stable to high RH, providing better charge performance under wet conditions.

For the comparative examples (MMA), the carbonyl oxygen has the HOMO frontier molecular orbitals located for the most part on the carbonyl oxygen atom, which is very polar and attracts water in high RH. That charging site is the electron transfer site which provides the negative charge to the toner silica additive acceptor site. Thus, water absorption at high RH will disturb the charge transfer (either by physically blocking the HOMO charge site or by actually disturbing the HOMO). As shown in Table 1, only 16% of the HOMO electron density is on the hydrophobic carbon for MMA. For CHMA, with the higher C/O ratio, there is an increase in HOMO delocalization from the carbonyl oxygen onto the hydrophobic substituent, the cyclohexyl group, to 21%. In DMAEMA, it is similar at 24%, again due to higher C/O ratio.

Examples of the present disclosure, PhMA, BMA, thiopyranyl MA and pyranyl MA, demonstrate more delocalization of the HOMO onto the hydrophobic part of the molecule. The trend is maximized for PhMA where 84% of the density is on the hydrophobic substituent. Except for pyridinyl MA, all samples with aromatic groups exhibit at least 43% delocalization. Even in the case of a lower C/O ratio of 3 for pyranyl MA, the electron density of the HOMO on the hydrophobic carbon is high (at 65%), predicting good RH performance since the charging site is hydrophobic. The pyranyl MA has highest electron density on the N atom and the attached carbons, and thus is not a preferred for electron delocalization, although pyranyl MA does have a high C/O ratio, so overall water adsorption at high RH will be better.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A developer comprising a carrier comprising a core particle and a coating resin comprising one or more acrOate monomer units, wherein at least one monomer unit comprises a vinyl group, wherein a carbon optionally is substituted with a methyl group, said carbon is substituted with an ester group, wherein said ester group comprises an aromatic electron delocalizing group comprising a thiopyranyl group; and a toner comprising surface additive, wherein said resin comprises a highest occupied molecular orbital and said additive comprises a lowest unoccupied molecular orbital.

2. The developer of claim 1, where said vinyl group comprises a methacrylate group.

3. The developer of claim 1, where said resin comprises a monomer with the formula, or isomers thereof:

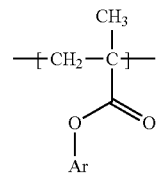

wherein Ar comprises the aromatic electron delocalizing group.

4. The developer of claim 1, wherein the resin comprises a Tg of between about 80° C. to about 140° C.

5. The developer of claim 1, wherein the at least one or more acrylate monomer units comprise a C/O ratio of at least about 3.

6. The developer of claim 1, wherein said resin further comprises a conductive material.

7. The developer of claim 1, wherein said resin further comprises a black colorant.

8. The developer of claim 1, wherein the resin further comprises an amine acrylate monomer unit.

9. The developer of claim 1, wherein said resin further comprises dimethylaminoethyl methacrylate.

10. The developer of claim 1, wherein said resin is a copolymer further comprising a monomer selected from dimethylaminoethyl methacrylate, diethylaminoethyl methacrylate, diisopropylaminoethyl methacrylate, t-butylaminoethyl methacrylate or cyclohexyl methacrylate.

11. The developer of claim 1, wherein the core particle is composed of iron, steel, a ferrite, a magnetite, nickel or combinations thereof.

12. The developer of claim 1, wherein said carrier is magnetic.

13. The developer of claim 1, wherein said toner comprises a shell.

14. The developer of claim 1, where said toner comprises at least one polyester resin.

15. The developer of claim 1, wherein said toner comprises an amorphous resin, a crystalline resin or both.

16. The developer of claim 1, wherein said toner comprises an aggregation/emulsion toner.

* * * * *